(12) United States Patent
Poulsen

(10) Patent No.: US 12,389,870 B2
(45) Date of Patent: Aug. 19, 2025

(54) CIP SYSTEM

(71) Applicant: E-CIP Concept ApS, Aarhus (DK)

(72) Inventor: Anders Holdflod Poulsen, Rayong (TH)

(73) Assignee: E-CIP Concept ApS, Aarhus C (DK)

( * ) Notice: Subject to any disclaimer, the term of this patent is extended or adjusted under 35 U.S.C. 154(b) by 238 days.

(21) Appl. No.: 17/927,970

(22) PCT Filed: May 6, 2021

(86) PCT No.: PCT/EP2021/062056
§ 371 (c)(1),
(2) Date: Nov. 28, 2022

(87) PCT Pub. No.: WO2021/239435
PCT Pub. Date: Dec. 2, 2021

(65) Prior Publication Data
US 2023/0217885 A1    Jul. 13, 2023

(30) Foreign Application Priority Data
May 29, 2020 (DK) .......................... PA 2020 00638

(51) Int. Cl.
| | |
|---|---|
| *A01J 7/02* | (2006.01) |
| *A01J 25/10* | (2006.01) |
| *A01J 25/12* | (2006.01) |
| *A23C 7/02* | (2006.01) |
| *B08B 9/027* | (2006.01) |
| *B08B 9/032* | (2006.01) |

(52) U.S. Cl.
CPC ............. *A01J 7/022* (2013.01); *A01J 25/126* (2013.01); *A23C 7/02* (2013.01); *B08B 9/027* (2013.01); *B08B 9/0325* (2013.01)

(58) Field of Classification Search
None
See application file for complete search history.

(56) References Cited

U.S. PATENT DOCUMENTS

| 4,061,504 A | 12/1977 | Zall et al. |
| 2002/0119574 A1 | 8/2002 | Berg |

(Continued)

FOREIGN PATENT DOCUMENTS

EP    1177847 A1    2/2002

OTHER PUBLICATIONS

International Search Report from International Application No. PCT/EP2021/062056; Date Mailed: Aug. 3, 2021.

(Continued)

*Primary Examiner* — Levon J Shahinian
(74) *Attorney, Agent, or Firm* — Morse, Barnes-Brown & Pendleton, P.C.; Sean D. Detweiler, Esq.

(57) ABSTRACT

A Cleaning-in-Place (CIP) system and process for cleaning objects are provided for use in a CIP plant suitable for, e.g., producing products requiring a high level of hygiene. The plant includes primary and optionally secondary tanks for cleaning media, a freshwater supply, one or more forward lines forwarding liquid (e.g., cleaning media or water) from the plant to one or more objects. Objects may include one unit or a part of a unit, such as a tank or pipeline, or a combination of units, and each object is subjected to a separate CIP flow. Return line(s) and forward line(s) manage liquid (e.g., cleaning media or water or freshwater) between various components of the system.

13 Claims, 1 Drawing Sheet

(56) References Cited

U.S. PATENT DOCUMENTS

| | | |
|---|---|---|
| 2004/0187897 A1 | 9/2004 | Kenowski et al. |
| 2010/0229899 A1 | 9/2010 | Andersen |
| 2014/0261550 A1 | 9/2014 | Erickson et al. |
| 2019/0003961 A1 | 1/2019 | Kenowski |

OTHER PUBLICATIONS

Danish Search Report from Danish Application No. PA 2020 00638; Date Mailed: Nov. 16, 2020.

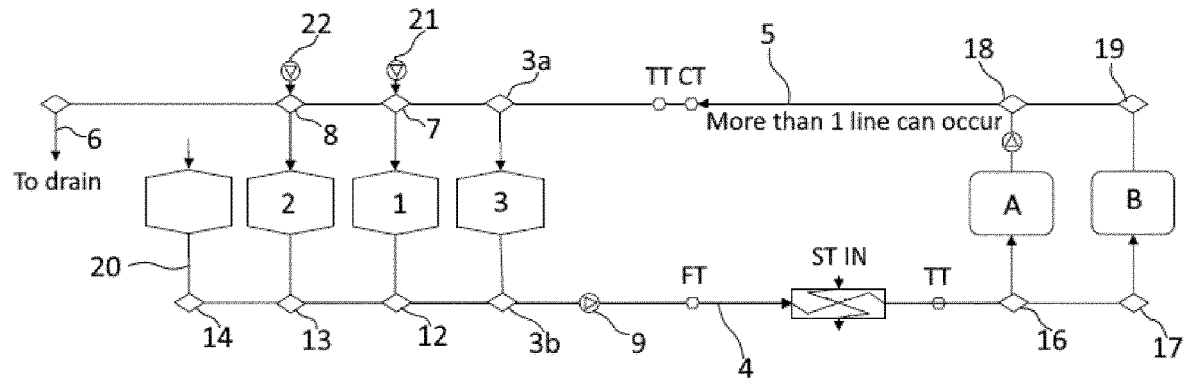
Figure 1 - Prior art
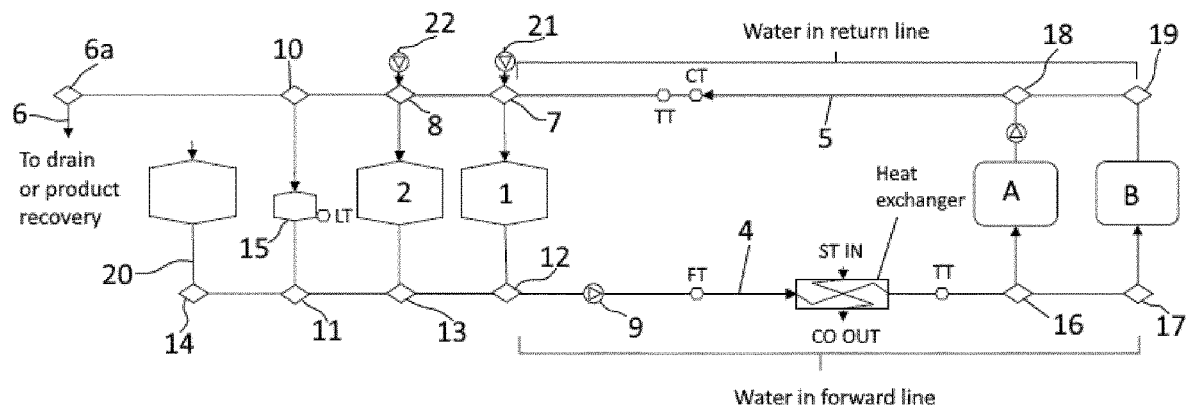
Figure 2

CIP SYSTEM

CROSS-REFERENCE TO RELATED APPLICATIONS

This application is a national stage filing under 35 U.S.C. 371 of International Application No. PCT/EP2021/062056, filed May 6, 2021, which claims priority to Denmark Application No. PA 2020 00638 filed May 29, 2020. The entire teachings of said applications are incorporated by reference herein. International Application No. PCT/EP2021/062056, was published under PCT Article 21(2) in English.

The present invention relates to Cleaning-in-Place or CIP system. CIP systems are often used in connection with production of food, beverages and pharmaceuticals or similar products requiring a high level of hygiene.

BACKGROUND ART

CIP is a common practice in food and life science process plants where proper cleaning is essential for manufacturing of high-quality products. An advantage of CIP is that the time where a process plant is out of production is significantly reduced compared to a manual cleaning procedure, and also that CIP makes it possible to utilize more aggressive cleaning chemicals in a contained environment which chemicals may not be safely handled during a manual cleaning procedure.

CIP comprises cleaning of complete items of plant of pipeline circuits without dismantling or opening the equipment and with little or no manual involvement of an operator. A CIP process normally involves jetting or spraying of surfaces or circulation of cleaning solutions through the plant under conditions of increased turbulence and flow velocity.

A CIP system normally comprises removing product residues from a process plant and will often be combined with a sanitation or sterilization process taking place after the CIP process and designed to eliminate microorganisms from the system.

A CIP system normally comprises vessels for preparation and storage of cleaning chemicals, pumps, and valves for circulation of the CIP chemicals throughout a plant or through plant units, instrumentation for monitoring the cleaning process and vessels for recovering of cleaning chemicals.

Known CIP cycles are traditionally made up of a combination of the following steps:
1) Initial purge to recover product, either into product tanks or to a product recovery system.
2) First rinse using recovered water (from final flush of previous CIP cycle) to remove gross soil.
3) Caustic wash with or without recovery to remove residual adhering debris.
4) Intermediate rinse to clear caustic from the system.
5) Acid wash with or without recovery to remove mineral scale.
6) Final rinse to clear any remaining chemicals from the system.
7) Sanitation using heat or chemical sanitizer to destroy any residual pathogen or otherwise damaging organisms.

Optionally the following operations may be included:
Warm pre-rinse prior to initial rinse to remove fats from pipe walls A two stage caustic wash in the case of heavily fouled equipment—the first wash is routed to drain whilst the second wash is recovered and re-used.
Intermediate cleans.
8) At the end of each CIP cycle fresh cleaning chemical may be dosed into the bulk tanks to make up for chemical lost during the clean.

US 2004/187897 A1 discloses a CIP system wherein the CIP system is in fluid communication with an inlet of the apparatus and the CIP system is in fluid communication with an outlet of the apparatus. A cleaning composition is supplied from a cleaner tank of the CIP system into the inlet of the apparatus for a first period of time of a first cleaning cycle. The cleaning composition has a measurable physical property (e.g., flow rate, pH, conductivity, turbidity, suspended solids, concentration, density, or temperature) at a first measured value. The cleaner tank has a cleaner supply valve and a cleaner return valve such that the cleaning composition may be recirculated through the cleaner tank and the apparatus. A rinsing composition from a rinse tank of the CIP system is supplied into the inlet of the apparatus for a second period of time of the first cleaning cycle. The rinsing composition has the measurable physical property at a second measured value different from the first measured value of the cleaning composition. The measurable physical property is sensed versus time for fluids exiting the outlet of the apparatus, and a circulation time of the cleaning composition from a predetermined time of the first period of time of the first cleaning cycle to an end time wherein the measurable physical property of the fluids has a third measured value different from the first measured value is determined. This provides for the location as a function to time of an interface between the cleaning composition and the rinsing composition. A cleaner return valve closing time for closing the cleaner return valve is then determined in dependence on the circulation time. The cleaner return valve closing time is then used after supplying the cleaning composition from the cleaner tank and thereafter supplying the rinsing composition from the rinse tank in a subsequent cleaning cycle. Preferably, the cleaner return valve closing time is selected such that no rinsing composition enters the cleaner tank during the subsequent cleaning cycle.

Compared to known CIP systems, a CIP system according to the present invention has the following advantages:
reduced water consumption resulting in environmental benefits and reduced daily costs,
eliminating a water recovery tank holding "dirty" water for a potential long time and the water recovery tank may need separate cleaning, i.e. a separate CIP procedure, with an added downtime of the known CIP system,
reducing construction costs for the CIP system as the need for a water recovery tank, and possibly a tank for fresh water, is eliminated.

DEFINITIONS OF WORDS

In general—is used when a disclosed embodiment can be combined with all embodiments of the invention, although the description of the embodiment is positioned in the detailed part of the description of the present document.

Fresh water or freshwater—is to be understood as "clean water" or "raw water" in the context of the present invention, however, the water may be sweet water, potable water, salt water or wastewater originating from another process.

SUMMARY OF INVENTION

The present invention relates to CIP-system used in connection with production of food or food components, or beverages or pharmaceutical products or similar products requiring a high level of hygiene.

According to one aspect of the invention, the invention relates to a CIP Process Plant for cleaning of one or more objects comprising
- a primary tank (1) for primary cleaning media,
- optionally a secondary tank (2) for secondary cleaning media,
- a supply of freshwater (20),
- one or more forward lines (4) forwarding liquid in form of primary or e.g. secondary, cleaning media or water from the CIP process plant to one or more objects (A, B) where one object may comprise one unit or a part of a unit such as a tank or pipeline or a combination of units and each object (A, B) is subjected to a separate CIP flow,
- one or more return lines (5) returning liquid in form of primary, e.g. secondary cleaning media or water from the object to the CIP process plant,
- valves (12, 13, 11, 14, 7, 8, 10, 6a) directing the flow through tanks and pipes of the CIP Process Plant, where each forward line (4) comprises valves (12, 13, 11, 14) directing liquid from either the supply of freshwater or from a vessel or a tank into a forward line ( )4, and each return line (5) comprises inlet valves (7, 8, 10, 6a) directing liquid from the return line (5) into a tank (1, 2, 15) or into a drain (6), wherein the forward line(s) is dimensioned and adapted to hold a liquid amount (VOL1) which corresponds to the liquid amount to be used in a first pre-flush step.

The volume VOL1 may be defined by the volume extending between the outlet valve from primary tank (1) and the inlet valve to the object, or a non-return valve positioned upstream of the object.

According to any embodiment of the invention, the system may comprise a recovering vessel (15) for recovered water, and the recovering vessel (15) comprises means configured to register content of the recovering vessel (15).

According to any embodiment of the invention, the recovering vessel (15) has a volume bigger than the volume VOL2 kept in return line 5. According to any embodiment of the invention, the system may comprise a recovering vessel (15) for recovered water, and the recovering vessel (15) comprises means configured to register content of the recovering vessel (15) and the means configured to register content of the recovering vessel (15) may comprises a sensor measuring level or volume in the recovering vessel (15).

According to any embodiment of the invention, the system may comprise a non-return valve NRV (NRV$_A$, NRV$_B$, . . . , NRV$_X$) positioned at the outlet end of each forward line (4).

According to any embodiment of the invention, each return line (5A, 5B, . . . 5X) may comprise a sensor able to detect concentration of a (each) cleaning media in the liquid flowing through the return line (5) and a corresponding transmitter configured to send a signal to a controller controlling the state (open/closed) of valves (7, 8, 10, 6a) directing liquid into either a tank or drain.

According to any embodiment of the invention, one or more of the tank(s) (1, 2) holding a cleaning media may comprise a heater H which heater H allows for heating of the cleaning media in the tank to improve cleaning of the object.

According to any embodiment of the invention, one or more return lines (5A, 5B, . . . 5X) may comprise a second sensor able to detect concentration of a cleaning media in the liquid flowing through the return line (5) and a corresponding transmitter configured to send a signal to a controller controlling the state (open/closed) of valves (7, 8, 10, 6a) in a position closer to the object than the first sensor i.e. downstream of the first sensor and upstream of the object.

According to a second aspect of the invention, the invention relates to a method for a CIP process in CIP plant comprising the following units:
- a primary tank (1) for primary cleaning media,
- a supply of freshwater (20),
- one or more forward lines (4) forwarding liquid in form of primary or e.g. secondary, cleaning media or water from the CIP process plant to one or more objects (A, B, . . . , X), which forward line(s) (4) hold a liquid amount (VOL1),
- one or more return lines (5) returning liquid in form of primary, e.g. secondary cleaning media or water from the object to the CIP process plant,
- valves (12, 13, 11, 14, 7, 8, 10, 6a) directing the flow through tanks and pipes of the CIP Process Plant, where each forward line (4) comprises valves (12, 13, 11, 14) directing liquid from either the supply of freshwater or from a vessel or a tank into a forward line (4), and each return line (5) comprises inlet valves (7, 8, 10, 6a) directing liquid from the return line (5) into a tank (1, 2, 15) or into a drain (6), wherein the process comprises the following step:
- a pre-flush step where the liquid volume (VOL1) held in the forward line (4) of the object to be cleaned is pushed forward through the object by primary cleaning media by opening of the outlet valve (12) from the primary cleaning media tank (1), opening the inlet valve (16, 17) to an object (A, B),
- the pre-flush step is stopped when the cleaning media front reaches the inlet to the object (A, B).

According to any embodiment of the second aspect of the invention, the pre-flush step the inlet valve (10) to a recovery vessel (15) may be open and a volume corresponding to the volume VOL2 of the return line (5) may be received in the recovery vessel and stored.

According to any embodiment of the second aspect of the invention, the pre-flush step is ended
- either as a measuring device such as a level transmitter defines that the volume VOL2 is received in the recovery vessel (15), or as a pre-set time has passed.

According to any embodiment of the second aspect of the invention, the liquid volume (VOL1) held in the forward line (4) is either freshwater or recovered water.

Preferably, the forward line (4) is filled with recovered water and normally the return line (5) is filled with freshwater at the end of the CIP procedure and the waters may remain in the forward and return lines until the next CIP process is running.

According to any embodiment of the second aspect of the invention, the recovery vessel 15 at the end of a CIP-cycle may be drained ensuring that no recovered water is reused more than once.

LIST OF FIGURES

FIG. 1 illustrates a CIP-system according to prior art.
FIG. 2 shows a first embodiment of a CIP-system according to the invention.
Throughout the application identical or similar elements of different embodiments are given the same reference numbers.

DESCRIPTION OF PRIOR ART

FIG. 1 shows a commonly used CIP system. The CIP system comprises a lye tank 1, an acid tank 2, a water recovery tank 3, a freshwater supply 20 in form of a freshwater tank, a drain 6 and two objects, a first object A and a second object B. The system comprises a forward line 4 (CIP-F) transporting CIP liquids forward to the object(s) and a return line 5 (CIP-R) returning CIP liquids to the tanks or drain. A forward pump 9 may force liquid from the tanks to the object.

The objects A, B are used for production e.g. of dairy products, beer or other beverages or food products, but lines relating to the production procedure(s) are not shown in the figures.

An object may be a single unit such as a tank or heater or other process equipment, or an object may be a process line comprising a combination of units. The CIP inlet to an object A or B is defined by an inlet valve 16, 17 and the CIP outlet from an object is defined by an outlet valve 18, 19, the inlet and/or the outlet valves to the object(s) are only opened during the CIP process, during operation or production both inlet and outlet valves to the object are closed. In general, one CIP system may be used for cleaning of one or for cleaning of several objects i.e. the two objects of FIG. 1 is chosen for illustrative purposes e.g. the objects may be placed in a parallel structure allowing for common use of the forward and returning lines 4, 5. Alternatively, each object may comprise individual forward and return lines with necessary inlet and outlet valves.

The lye tank 1 comprises an inlet valve 7 and an outlet valve 12. When the inlet valve 7 is open liquid is directed from the return line 5 to the lye tank 1 and when the inlet valve 7 is closed liquid cannot enter into the lye tank 1. When the outlet valve 12 is open, liquid is directed from the lye tank 1 into the forward line 4.

The acid tank 2 comprises an inlet valve 8 and an outlet valve 13. When the inlet valve 8 is open liquid is directed from the return line 5 to the acid tank 2 and when the inlet valve 8 is closed liquid cannot enter into the acid tank 2. When the outlet valve 13 is open, liquid is directed from the acid tank 2 into the forward line 4.

The water recovery tank 3 comprises an inlet valve 3a and an outlet valve 3b. When the inlet valve 3a is open liquid is directed from the return line 5 to the water recovery tank 3 and when the inlet valve 3a is closed liquid cannot enter into the water recovery tank 3. When the outlet valve 3b is open, liquid is directed from the water recovery tank 3 into the forward line 4.

If liquid returned from the object(s) A, B through the return line 5 does not enter a tank 1, 2, 3, the liquid may enter into the drain 6.

The CIP system of FIG. 1 comprises a freshwater supply 20 comprising a freshwater tank. When freshwater is delivered by a freshwater tank, the pressure provided by the liquid content in the tank may provide pressure to force water into the forward line 4.

Traditionally, pre-flush is done using recovered water from a water recovery tank 3, the recovered water normally originates from the final flushing of the previous CIP cycle. During the pre-flush, the recovered water is then forwarded to a drain 6 as the water will be too soiled with residues from the object and therefore cannot be used further.

A CIP cycle in a prior art system normally comprises the following combination of steps:

1) A Pre-Flush Using Recovered Water from Water Recovery Tank 3 to Remove Gross Soil.

The duration of the pre-flush step is normally set by a timer, $t_{preflush}$, and a cleaning protocol for the process plant may set a minimum time for pre-flushing, the pre-flush time $t_{preflush}$ for a traditional CIP system is normally between 10-60 seconds. During the pre-flushing step the outlet valve 3b for the water recovery tank 3 is opened, the inlet valve 16 or 17 to an object A or B is opened, a CIP-return pump is running and the outlet valve 18 or 19 from the object A or B is opened, the inlet valve 3a for the water recovery tank 3 is closed and the valve to the drain 6 is opened. The forward pump 9 is turned on and water from the recovery tank 3 is pumped through the object A or B and pumped into the drain 6 for the desired time, $t_{preflush}$. The flow of the pre-flush liquid removes soil from the surface of the object(s).

When pre-flush step finish, the outlet valve 3b from the water recovery tank 3 is closed, and step 2) starts.

2) Pushing Recovered Water Out of CIP Lines Before Caustic Wash.

To start the caustic wash, the outlet valve 12 of the lye tank 1 is opened and the forward pump 9 forces lye from the tank 1 to the object A or B. The valve to the drain 6 will remain open until a concentration sensor/transmitter CT placed in the return line 5 registers a content of lye in the return liquid. This step is called "Lye push" and the lye-push removes "dirty" water from the object(s), the forward line 4 and the return line 5 and pushes the "dirty" water to the drain 6.

3) Caustic Wash with or without Recovery to Remove Residual Adhering Debris.

When a content of lye is registered in the liquid of the return line 5, the valve to the drain 6 may be closed and the inlet valve 7 to the lye tank 1 opened where after circulation of lye through the object A or B and the lye tank 1 may continue for pre-set time, $t_{lyewash}$, $t_{lyewash}$ is normally set to between 5-20 minutes. This step is called "Lye wash". The lye wash may also be performed without circulation of lye, i.e. the used lye liquid may be sent to drain and not circulated to the lye tank 1.

When lye wash step finish, the outlet valve 12 from the lye tank 1 is closed, and the outlet valve 14 of the freshwater tank is opened. At this point the object(s), the forward line 4 and the return line 5 are filled with used lye.

4) Intermediate Rinse to Clear Caustic from the System.

To clear the object and CIP lines from liquid containing lye, a water plug is pushed through the CIP lines and the object A or B by opening of the outlet valve 14 of the freshwater tank for a short period, $t_{waterplug}$. $t_{waterplug}$ is normally between 10-90 seconds. The forward pump 9 may force water from the fresh water supply through the object A or B and into the drain 6 for the desired time $t_{waterplug}$. When the sensor/transmitter CT register a fresh water in the return line 5, the inlet valve 7 to the lye tank is closed and the valve to the drain 6 is opened.

When intermediate rinse step finish, the outlet valve 14 from freshwater supply is closed, and the outlet valve 13 of the acid tank 2 is opened.

5) Pushing Used Water Out of CIP Lines Before Acid Wash.

To start the acid wash, the outlet valve 13 of the acid tank 2 is opened and the forward pump 9 forces the acid from the tank 2 to the object A or B. The valve to the drain 6 may be closed and the inlet valve 3a to the water recovery tank 3 may be opened, i.e. used water is directed to the water recovery tank 3 until a concentration transmitter CT placed in the return line 5 registers a content of acid in the return liquid. This step is called "Acid push", the step normally lasts between 10-90 seconds.

6) Acid Wash with or without Recovery to Remove Mineral Scale.

When a content of acid is registered in the liquid in the return line 5, the inlet valve 3a to the water recovery tank 3 is closed and the inlet valve 8 to the acid tank 1 is opened where after circulation of acid through the object A or B and the acid tank 2 may be continued for pre-set time, $t_{acidwash}$, $t_{acidwash}$ is normally set to between 5-15 minutes. This step is called "Acid wash". The acid wash may be performed without circulation of acid, i.e. the used acid liquid may be sent to drain 6 and not circulated to the acid tank 2.

When acid wash step finish, the outlet valve 13 from the acid tank 2 is closed, and the outlet valve 14 of the freshwater supply is opened.

7) Pushing Acid Out of CIP Lines Before Final Rinse.

To clear the object and CIP lines of acid, the outlet valve 13 of the acid tank 2 is closed, the outlet valve 14 from freshwater supply is opened and freshwater is pushed through the CIP lines and the object A or B. Normally the inlet valve 8 to the acid tank 2 is opened, and used acid containing liquid is pushed into the acid tank 2 until a concentration sensor/transmitter CT placed in the return line 5 registers a content of acid in the liquid in the return line 5. This step is called "Freshwater push", the step normally lasts between 15-90 seconds.

When freshwater push step finish, the inlet valve 8 to the acid tank 2 is closed, and the inlet valve 3a of the water recovery tank 3 is opened.

8) Final Flush to Clear Remaining Chemicals from the System.

The last step of the CIP procedure is to remove remaining cleaning chemicals from the object A, B. Freshwater is forced from the freshwater supply to the water recovery tank 3 by opening the inlet valve 3a to the water recovery tank 3. This step is called "Freshwater flush" and normally lasts around 10-30 seconds.

At the end of the CIP procedure, the forward line 4 and the return line 5 are filled with freshwater which will remain in the lines until next CIP process is run.

DETAILED DESCRIPTION OF INVENTION

In general, the invention relates to a CIP Process Plant or CIP system for cleaning of one or more object(s) comprising:
- a primary tank 1 for primary cleaning media e.g. a lye tank 1,
- the system may also comprise a secondary tank 2 for secondary cleaning media e.g. an acid tank 2, and the system may also comprise a tertiary tank for a further cleaning media,
- a supply of freshwater or access to a supply of freshwater such as a freshwater line where the water maintains a relatively constant pressure, the water may also come from a freshwater tank,
- one or more forward lines 4 (4A, 4B, . . . , 4X) forwarding liquid such as cleaning media, primary or secondary or tertiary, or water from the CIP system to an object A, B, . . . , X, one object may comprise one unit or a part of a unit such as a tank or pipeline or a combination of units and each object A, B, . . . , X is subjected to a separate CIP flow,
- one or more return lines 5 (5A, 5B, . . . , 5X) returning liquid such as cleaning media, primary or secondary or tertiary, or water from the object to the CIP system,
- one or more recovering vessels V (VA, VB, . . . , VX).

Each forward line 4 comprises or is configured with a series of valves 12, 13, 11. 14 directing liquid from either the freshwater supply or from a vessel or a tank into a forward line 4,
- a control valve 14 positioned at the inlet end of each forward line 4 controlling the amount of freshwater flowing into and through the forward line 4,
- a first outlet valve or valve system 12 (12A, 12B, . . . , 12X) controlling inlet of liquid from the primary tank 1 into a forward line 4,
- a second outlet valve or valve system 13 (13A, 13B, . . . , 13X) controlling inlet of liquid from the optional secondary tank 2 into the forward line 4,
- a third outlet valve or valve system 11 (11A, 11B, . . . , 11X) controlling inlet of liquid from a recovering vessel 15 into the forward line 4,
- a non-return valve NRV ($NRV_A, NRV_B, \ldots, NRV_X$) may be positioned at the outlet end of each forward line 4.

Each return line 5 comprises or is configured with a series of inlet valves 7, 8, 10, 6a controlling inlet of liquid from the return line 5 into a tank 1, 2, 15 or into a drain 6
- a first valve or valve system 7 (7A, 7B, . . . , 7X) controlling inlet of liquid from a return line 5 into the primary tank 1,
- a second valve or valve system 8 (8A, 8B, . . . , 8X) controlling inlet of liquid from a return line 5 into the secondary tank 2,
- a third valve or valve system 10 (10A, 10B, . . . , 10X) controlling inlet of liquid from a return line into a recovering vessel 15. The amount of liquid (VOL4) into the vessel is controlled by a level transmitter equipped in each of the recovery vessels 15.
- a fourth valve or valve system 6a (6aA, 6aB, . . . , 6aX) controlling inlet of liquid from a return line 5 into a drain
- each return line 5A, 5B, . . . 5X further comprises a sensor able to detect concentration of a (each) cleaning media in the liquid flowing through the return line 5 and a corresponding transmitter configured to send a signal to a controller controlling the state (open/closed) of valves directing liquid into either a tank or drain 7, 8, 10, 6a.

E.g. the valve or valve systems of the forward line 4 and the return line 5 i.e. valves 14, 12, 13, 7, 8, 10, may be constituted of or comprise a single valve able to split one flow into two flows.

Some objects do not need cleaning with more than one cleaning media, all parts relating to a secondary or a further cleaning media are therefore optional.

The tank(s) 1, 2 holding a cleaning media may comprise a heater H (H1, H2) which heater H may allow for heating of the cleaning media in the tank in order to improve cleaning of the object.

The tank(s) 1, 2 holding a cleaning media may also comprise an inlet I (I1, I2) for cleaning chemical which inlet I allows for dosing of active ingredients into the tank to maintain the efficiency of the cleaning media in the tank.

A CIP process requires control of the "physical action" provided by the cleaning media, and the physical action is achieved primarily by manipulating flow rates to maintain desired flow velocities through all CIP circuit sub-paths. A CIP system may include a flowmeter to control delivery volume and monitor flow rates. The flowmeter, e.g. combined with a frequency converter on the CIP-F pump and associated PID loop, works to control CIP supply flow to match the cleaning circuit setpoint.

A critical parameter for a CIP process is the time during which soiled process equipment i.e. the object, is exposed to the physical actions of flush and wash by cleaning media.

In general, exposure time during active flow phases may be controlled through volume monitoring. During sequences where flow is not active, for example a drain step, these phases are typically controlled through a software-controlled timer.

Cleaning media concentration may be confirmed through conductivity monitoring at the start of a washing sequence, and it may be confirmed throughout the duration of the washing sequence.

According to the present invention, a cleaning media may comprise commonly used chemicals for soil removal such as Lye or Caustic Soda (NaOH, KOH), Phosphoric and Nitric acids, Sodium Hypochlorite (Hypo) and Peracetic Acid (PAA). Caustic Soda is an alkali typically used at 0.5%-2% volume. Lye and Caustic soda react with fats in the soil and softens it for removal. Alkaline solutions are not effective for removing scaling why a first cleaning with a strong alkaline solution is often followed by a cleaning with an acidic cleaning media. Also, sequestrants may be added to the cleaning media to keep soiling in solution.

Phosphoric and Nitric Acids may be used in detergent formulations for scale removal, often at lower temperatures than alkaline solutions. The acids can attack valve and pump seals. Acids may e.g. be used intermittently in dairies e.g. for one week in every 6 weeks to remove milk scale and can be used after commissioning to remove installation debris.

Raw water is normally clean water from the tap system, i.e. of drinking water quality, and the water may have a certain content of microorganisms. The purpose of a CIP system is not to sterilize an object but to clean the object from remains from the production process taking place in the object, if it is necessary to sterilize the object, i.e. remove or reduce the number of microorganisms, the CIP process may be followed by a sanitation or sterilization process.

FIG. 2 shows a first embodiment of a CIP-system according to the invention. A CIP system according to the invention may comprise plurality of separate CIP-lines directing CIP liquids to and from independent objects A, B, . . . , X, normally between 1-6 separate CIP-lines. However, the embodiment of FIG. 2 comprises 2 objects A and B in order to give a simple illustration of the CIP-system.

Description of Method

A CIP process or cycle in a CIP system according to the invention may comprise the following combination of steps:
1) Pre-Flush with Water At the start of the pre-flush of an object A,B a volume VOL1 of water is held in the forward line 4 between outlet valve 12 of the primary tank 1 and inlet valve 16, 17 of an object and the return line 5 holds a volume VOL2, all outlet and inlet valves of the forward line 4 and of the return line 5 are closed from the previous CIP-cycle stops and the pre-flush of a new CIP-cycle begins.

The pre-flush step begins by opening of the outlet valve 12 from the primary cleaning media tank 1, opening of an inlet valve 16 or 17 to an object A or B and opening of an inlet valve 10 to the recovery vessel 15. Then the forward pump 9 may be turned on and the VOL1 water held in the forward line 4 flows into the object while the volume of the return line 5 VOL2 is pushed or pumped into the recovery vessel 15.

The VOL1 water standing in the forward line 4 at the beginning is pushed forward into and through the object A or B and pumped into the return line 5 by the primary cleaning media as the primary cleaning media is forced out of the primary tank 1 by the CIP-forward pump 9. The amount of cleaning media leaving the primary cleaning media tank 1 during the pre-flush step corresponds to the volume VOL1 of the forward line 4.

The duration of the pre-flush step is normally around 10-60 seconds.

However, the pre-flush time is determined by how long time it takes for the volume VOL1—or for the front of the pushing lye volume—to travel the distance/the velocity between the primary tank 1 and the object.

The volume VOL1 of the forward line 4 may be dimensioned in order to satisfy a maximum or minimum pre-flush time i.e. the length of the forward line 4 may be reduced or increased compared to a traditionally designed CIP system. The volume VOL1 of the forward line 4 i.e. the length and the diameter, is adapted to the object and to the fouling of the object, i.e. a larger volume is provided by a longer distance and/or bigger dimensioned forward line 4 for larger or more dirty objects. The pre-flush step stops when the cleaning media front reaches the inlet valve 16 or 17 to the object A or B to be cleaned, i.e. when the forward line 4 has been filled with cleaning liquid, VOL1.

The amount entering the recovery vessel 15 during the pre-flush step corresponds to the volume VOL2 defined by the volume of the return line 5 from the object to the CIP plant, i.e. it comprises the water volume VOL2 held in the return line 5 at the beginning of the pre-flush step, this water is clean as it originates from the previous final flush with freshwater/raw water.

In order to close the inlet valve 10 at the correct time it may be measured how much liquid enters the recovery vessel 15. E.g. a level sensor and transmitter (LT) may be mounted in the recovery vessel 15, a level sensor and transmitter may signal when the volume VOL2 of water has been received in the recovery vessel 15 and this signal instigate the closure of the inlet valve 10 to the recovery vessel 15 and opening of the valve 6a to the drain 6 or to product recovery.

After the pre-flush, the forward line 4 has been filled with primary cleaning media, the volume VOL2 held in the return line 5 at the beginning of the pre-flush step has been collected in the recovery vessel 15, and the liquid in the return line 5 comprises product remains from the object pumped out of the object A or B e.g. by a CIP-return pump and travelling in front of cleaning media and the water volume VOL1.

Step 1a: Optional Pre-Lye Flush

Optionally, a pre-flush provided by opening the outlet valve 12 to the tank 1 for primary cleaning media for a short period such as a few seconds may be followed by closing the outlet valve 12 from the tank 1 and then opening for inlet valve 14 for freshwater for a short period such as a few seconds in order to keep the lye-tank in a clean condition for a longer time. The liquid let into the CIP process during the pre-lye flush will be let to the drain 6 after having passed through the object.

The steps 2)-7) according to the invention is similar to step 2)-7) of the prior art, however, there are differences as the process according to the invention does not involve a large water recovery tank:

2) Pushing Used Water Out of CIP Lines Before Caustic Wash (Lye Push)

To start the caustic wash, the outlet valve 12 of the lye tank 1 is opened and the forward pump 9 or other driving means forces the lye from the tank 1 to the object A or B. The valves allowing flow to the drain 6 will remain open until a concentration sensor/transmitter CT placed in the return line 5 registers a content of lye in the return liquid.

3) Lye Wash or Caustic Wash with or without Recovery to Remove Residual Adhering Debris When a content of lye is registered in the liquid in the return line 5, the valve(s) to the drain 6 may be closed and the inlet valve 7 to the lye tank 1 may be opened where after circulation of lye through the object A or B and the lye tank 1 may continue for pre-set time, $t_{lyewash}$, $t_{lyewash}$ is normally set to between 5-20 minutes.

When the caustic wash step finish, the outlet valve 12 from the lye tank 1 is closed, and the outlet valve 11 from the recovery vessel 15 is opened to initiate next step.

If washing with a secondary cleaning media such as acid is relevant for the object in question, the process will continue to step 4), if washing with a secondary cleaning media is not relevant, the process will jump to step 7). If washing with more than two cleaning media is relevant for the object in question, step 4) to 6) may be repeated for relevant tanks of cleaning media.

4) Intermediate Rinse to Clear Caustic from the System (Water Plug).

To clear the object and CIP lines from primary cleaning media, a water plug is pushed through the forward line 4 and to the object by opening of the outlet valve 11 of the recovery vessel 15. The forward pump 9 forces the water plug through to the object A, B until the recovery vessel, 15, is empty.

When intermediate rinse step finish, the outlet valve 11 from recovery vessel 15 is closed, and the outlet valve 13 of the acid tank 2 is opened.

5) Pushing Used Water Out of CIP Lines Before Acid Wash (Acid Push)

To start the acid wash, the outlet valve 13 of the acid tank 2 is opened and the forward pump 9 forces the acid from the tank 2 to the object A, B. The inlet valve, 7, to primary cleaning tank 1 remains open until all cleaning media is returned to tank 1. Then valve 7 will close and the inlet valve 10 to the recovery vessel 15 may be opened, i.e. used water is directed to the recovery vessel 15 until a concentration transmitter CT placed in the return line 5 registers a content of acid in the return liquid. This step is called "Acid push", the step normally lasts between 10-100 seconds.

6) Acid Wash with or without Recovery to Remove Mineral Scale.

When a content of acid is registered in the return liquid, the inlet valve 10 to the recovery vessel 15 is closed and the inlet valve 8 to the acid tank 1 is opened where after circulation of acid through the object A, B and the acid tank 2 may be continued for pre-set time, $t_{acidwash}$, $t_{acidwash}$ is normally set to between 5-15 minutes. This step is called "Acid wash". The acid wash may be performed without circulation of acid, i.e. the used acid liquid may be sent to drain and not circulated to the acid tank 2.

When acid wash step finish, the outlet valve 13 from the acid tank 2 is closed, and the outlet valve 14 of the freshwater supply is opened.

7) Fresh Water Push Pushing Cleaning Media Out of CIP Lines (Raw Water Push)

To clear the object and CIP lines of cleaning chemicals, the outlet valve from the tank of last cleaning media is closed, the outlet valve 14 from freshwater supply is opened and a volume, VOL3, of freshwater is pushed through the CIP lines and the object A, B.

Normally, the inlet valve to the tank of the last cleaning media is opened and used cleaning media liquid is pushed into the cleaning media tank until a concentration sensor/transmitter CT placed in the return line 5 registers that there is little or no cleaning media in the return liquid, then the inlet valve to the cleaning media tank is closed.

The freshwater push will at least comprise a volume VOL1 to assure that the forward line 4 is filled with fresh water, and normally the water push will be larger than the volume VOL1, i.e. VOL3 is between 1.1-1.6 times VOL1 to assure that the fresh water front has passed through the object and entered into the return line 5.

8) Flush by Recovered Water

After step 7, the outlet valve 11 from the recovery vessel 15 is opened. The water from the recovery vessel 15, which was collected during the pre-flush step, pushes the fresh water in the forward line 4 towards the object, before the not-clean water of the recovery vessel 15 approaches the object the flow is stopped in time to keep the recovered water in a safe distance from the object. Any remaining water in the recovery vessel 15 (VOL1 minus an amount ensuring proper distance to the object) will be drained to ensure that recovered water is only used once.

At the end of the CIP procedure, the forward line 4 is mainly filled with recovered water and the return line 5 is filled with freshwater which will remain in the lines until next CIP process is running.

The fresh water has also been pushed into the return line 5, and the water from the return line 5 is either send to drain or used to fill a cleaning media tank.

At the end of step 8) all inlet and outlet valves of the system is closed and the liquid content in respectively the forward line 4 (VOL1) and the return line 5 (VOL2) is maintained, i.e. the content is not sent to the drain or to a tank.

The freshwater may come from a raw water line, the pressure in the line is considered stable and the flow into the forward line 4 is controlled by a control valve or inlet valve 14.

The control or inlet valve 14 may be a butterfly valve with an I/P top used to convert a 4-20 mA signal from a control system to a 3 to 15 psig pneumatic signal that a pneumatic positioner can interpret and send to the control valve.

The control valve 14 is controlled by the signal from the flow transmitter FT1 mounted downstream of the remaining valves on the forward line 4. The forward pump 9 may be stand-by and may only be needed if the pressure in the raw water line is too low to push the liquid through the system.

When the concentration transmitter CT1 detects a reference value concentration, the control valve 14 is closed.

The below tables 1 and 2 illustrates examples of CIP process steps for respectively a system according to the invention, table 1, and a system according to prior art, table 2. The calculations are based on a forward line of 60 meters of 4" pipe, corresponding to 40.000 l/hr at 1.5 m/sec extending between the CIP plant and the object keeping a volume, VOL1 is 480 L and a return line of 60 meters of 4" pipe extending from the object and back to the CIP plant and the volume VOL2 is 480 L.

The process of table 2 is based on that the recovery water tank contains minimum 600 L water before start. The tank 15 for recovered water of the process of table 1 is empty before start of the cycle and has a volume of minimum the content kept in the longest/biggest return line 5.

The first table illustrate a CIP cycle according to the invention and the second table illustrate a CIP cycle according to prior art.

TABLE 1

| Invention | from | to | RW/L | Rec. water inlet/L | Rec. water outlet/L | Drain/L | Time/Sec. | Step no. |
|---|---|---|---|---|---|---|---|---|
| Pre-flush | Lye Tk | Rec. vessel | 0 | 480 | 0 | 0 | 40 | Step 1 |
| Lye push | Lye Tk | Drain | 0 | 0 | 0 | 480 | 40 | Step 2 |
| Lye wash | Lye Tk | Lye Tk | 0 | 0 | 0 | 0 | 900 | Step 3 |
| Water plug | Rec. vessel | Lye Tk | 0 | 0 | 480 | 0 | 40 | Step 4 |
| Acid push | Acid Tk | Lye Tk | 0 | 0 | 0 | 0 | 40 | Step 5 |
| Acid push2 | Acid Tk | Rec. vessel | 0 | 480 | 0 | 0 | 40 | Step 5 |
| Acid wash | Acid Tk | Acid Tk | 0 | 0 | 0 | 0 | 600 | Step 6 |
| RW push | RW line | Acid Tk | 480 | 0 | 0 | 0 | 40 | Step 7 |
| RW push2 | RW line | Acid Tk | 240 | 0 | 0 | 0 | 20 | Step 7 |
| Rec. water push | Rec. vessel | Acid Tk | 0 | 0 | 240 | 0 | 20 | Step 8 |
| Rec. water push2 | Rec. vessel | Drain | 0 | 0 | 120 | 120 | 10 | Step 8 |
| Drain Rec. vessel | Rec. vessel | Drain | 0 | 0 | 120 | 120 | 0 | Step 8 |
| Total | | | 720 | 0 | 0 | 720 | 1690 | |

TABLE 2

| Prior art | from | to | RW/L | Rec. water inlet/L | Rec. water outlet/L | Drain/L | Time/Sec. |
|---|---|---|---|---|---|---|---|
| Pre-flush | Ret. Tk | Drain | 0 | 0 | 120 | 120 | 10 |
| Lye push | Lye Tk | Drain | 0 | 0 | 0 | 480 | 40 |
| Lye push 2 | Lye Tk | Drain | 0 | 0 | 0 | 480 | 40 |
| Lye wash | Lye Tk | Lye Tk | 0 | 0 | 0 | 0 | 900 |
| Water plug | Rec. Tk | Lye Tk | 0 | 0 | 480 | 0 | 40 |
| Acid push | Acid Tk | Lye Tk | 0 | 0 | 0 | 0 | 40 |
| Acid push 2 | Acid Tk | Rec. Tk | 0 | 480 | 0 | 0 | 40 |
| Acid wash | Acid Tk | Acid Tk | 0 | 0 | 0 | 0 | 600 |
| RW push | RW tank | Acid Tk | 960 | 0 | 0 | 0 | 80 |
| RW flush | RW tank | Rec. Tk | 120 | 120 | 0 | 0 | 10 |
| Total | | | 1080 | 0 | 0 | 1080 | 1800 |

| Ref. no. | Ref. name |
|---|---|
| 1 | Lye tank |
| 2 | Acid tank |
| 3 | Water recovery tank |
| 3a | Inlet valve for water recovery tank |
| 3b | Outlet valve for water recovery tank |
| 4 | Forward line |
| 5 | Return line |
| 6 | Drain |
| 6a | Valve for drain |
| 7 | Inlet valve for lye tank |
| 8 | Inlet valve for acid tank |
| 9 | Forward pump |
| 10 | Inlet valve for water recovery vessel |
| 11 | Outlet valve for water recovery vessel |
| 12 | Outlet valve for lye tank |
| 13 | Outlet valve for acid tank |
| 14 | Inlet valve for freshwater |
| 15 | Water recovery vessel |
| 16 | Inlet valve for first object A |
| 17 | Inlet valve for second object B |
| 18 | Outlet valve for first object A |
| 19 | Outlet valve for second object B |
| 20 | Freshwater supply |
| 21 | Supply of lye |
| 22 | Supply of acid |

The invention claimed is:

1. A Cleaning-in-Place (CIP) process plant for cleaning of one or more objects comprising:
a primary tank for primary cleaning media;
a supply of freshwater;
one or more forward lines forwarding liquid in the form of primary or secondary cleaning media or water from the CIP process plant to one or more objects where one object comprises one unit or a part of a unit, such as a tank or pipeline, or a combination of units and each object is subjected to a separate CIP flow;
one or more return lines returning liquid in form of cleaning media or water from the object to the CIP process plant;
valves directing the flow through tanks and pipes of the CIP Process Plant, where each forward line comprises valves directing liquid from either the supply of freshwater or from a vessel or a tank into a forward line, and each return line comprises inlet valves directing liquid from the return line into a tank or into a drain;
wherein the forward line(s) is dimensioned and adapted to hold a liquid amount that corresponds to the liquid amount to be used in a first pre-flush step.

2. The CIP process plant according to claim 1, wherein the system comprises a recovering vessel for recovered water, and the recovering vessel comprises means configured to register content of the recovering vessel.

3. The CIP process plant according to claim 2, wherein the recovering vessel has a volume bigger than the volume kept in the return line.

4. The CIP process plant according to claim 2, wherein the means configured to register content of the recovering vessel comprises a sensor measuring level or volume in the recovering vessel.

5. The CIP process plant according to claim 1, comprising a non-return valve (NRV) positioned at the outlet end of each forward line.

6. The CIP process plant according to claim 1, wherein each return line comprises a sensor configured to detect concentration of cleaning media in the liquid flowing through the return line and a corresponding transmitter configured to send a signal to a controller controlling an open or closed state of valves directing liquid into either a tank or drain.

7. The CIP process plant according to claim 1, wherein one or more of the primary or secondary tank(s) holding a cleaning media comprises a heater which heater allows for heating of the cleaning media in the tank to improve cleaning of the object.

8. The CIP process plant according to claim 1, wherein one or more return lines comprises a second sensor configured to detect concentration of a cleaning media in the liquid flowing through the return line and a corresponding transmitter configured to send a signal to a controller controlling an open or closed state of valves in a position closer to the object than the first sensor downstream of the first sensor and upstream of the object.

9. The CIP process plant according to claim 1, wherein the system comprises a secondary tank for secondary cleaning media.

10. A method for a CIP process in CIP plant comprising the following units:
   a primary tank for primary cleaning media;
   a supply of freshwater;
   one or more forward lines forwarding liquid in form of primary and/or secondary, cleaning media or water from the CIP process plant to one or more objects, which forward line(s) hold a liquid amount;
   one or more return lines returning liquid in form of primary, or secondary cleaning media or water from the object to the CIP process plant;
   valves directing the flow through tanks and pipes of the CIP Process Plant, where each forward line comprises valves directing liquid from either the supply of freshwater or from a vessel or a tank into a forward line, and each return line comprises inlet valves directing liquid from the return line into a tank or into a drain;
   wherein the process comprises the following step:
   a pre-flush step where the liquid volume held in the forward line of the object to be cleaned is pushed forward through the object by primary cleaning media by opening of the outlet valve from the primary cleaning media tank, opening the inlet valve to an object;
   the pre-flush step is stopped when the cleaning media front reaches the inlet to the object.

11. The method according to claim 10, wherein during the pre-flush step the inlet valve to a recovery vessel is open and a volume corresponding to the volume of the return line is received in the recovery vessel and stored.

12. The method according to claim 10, wherein the pre-flush step is ended:
   either as a measuring device such as a level transmitter defines that the volume is received in the recovery vessel; or
   as a pre-set time has passed.

13. The method according to claim 10, wherein the liquid volume held in the forward line at the end of the CIP procedure is either freshwater or recovered water, and this water remains in the forward line(s) until the next CIP process starts.

* * * * *